United States Patent
Xue et al.

(10) Patent No.: US 11,599,741 B1
(45) Date of Patent: *Mar. 7, 2023

(54) GENERATING DATA IN A MESSAGING SYSTEM FOR A MACHINE LEARNING MODEL

(71) Applicant: Snap Inc., Santa Monica, CA (US)

(72) Inventors: Zehao Xue, Los Angeles, CA (US); Zhou Ren, Bellevue, WA (US)

(73) Assignee: SNAP INC., Santa Monica, CA (US)

( * ) Notice: Subject to any disclaimer, the term of this patent is extended or adjusted under 35 U.S.C. 154(b) by 459 days.

This patent is subject to a terminal disclaimer.

(21) Appl. No.: 16/774,796

(22) Filed: Jan. 28, 2020

Related U.S. Application Data

(63) Continuation of application No. 15/829,572, filed on Dec. 1, 2017, now Pat. No. 10,643,104.

(51) Int. Cl.
 *G06K 9/62* (2022.01)
 *G06N 20/00* (2019.01)
 *G06V 20/68* (2022.01)

(52) U.S. Cl.
 CPC ......... *G06K 9/6253* (2013.01); *G06K 9/6256* (2013.01); *G06N 20/00* (2019.01); *G06V 20/68* (2022.01); *G06V 2201/10* (2022.01)

(58) Field of Classification Search
 CPC .... G06K 9/6253; G06K 9/6256; G06N 20/00; G06V 20/68; G06V 2201/10
 See application file for complete search history.

(56) References Cited

U.S. PATENT DOCUMENTS

| | | | |
|---|---|---|---|
| 9,418,482 B1 * | 8/2016 | Yang | G06T 19/006 |
| 9,484,046 B2 | 11/2016 | Knudson et al. | |
| 9,563,623 B2 * | 2/2017 | Sawhney | G06F 16/9537 |
| 10,643,104 B1 * | 5/2020 | Xue | G06V 20/70 |
| 2016/0110381 A1 | 4/2016 | Chen et al. | |
| 2016/0196577 A1 | 7/2016 | Reese et al. | |
| 2017/0064515 A1 | 3/2017 | Heikkila et al. | |
| 2017/0109615 A1 * | 4/2017 | Yatziv | G06V 20/70 |
| 2017/0262973 A1 * | 9/2017 | Johnston | F25D 29/00 |
| 2017/0330056 A1 * | 11/2017 | Merhav | G06V 10/82 |
| 2018/0300341 A1 * | 10/2018 | Hadar | G06F 16/9537 |
| 2019/0207889 A1 * | 7/2019 | DeLuca | G06K 9/6267 |
| 2020/0342366 A1 * | 10/2020 | Nishida | G06N 20/00 |

(Continued)

OTHER PUBLICATIONS

"U.S. Appl. No. 15/829,572, Non Final Office Action dated Oct. 24, 2019", 6 pgs.

(Continued)

*Primary Examiner* — Lewis G West
(74) *Attorney, Agent, or Firm* — Schwegman Lundberg & Woessner, P.A.

(57) ABSTRACT

Systems and methods are provided for analyzing, by a computing device, location data associated with a location of the computing device to determine that an image or video captured using a messaging application on the computing device is captured near a food-related venue or event, receiving input related to food associated with the food-related venue or event, sending the image or video and the input related to food associated with the food-related venue or event to a computing system to train a machine learning model for food detection, and updating the messaging application to comprise the trained machine learning model for food detection.

18 Claims, 11 Drawing Sheets

(56) References Cited

U.S. PATENT DOCUMENTS

2021/0199457 A1* 7/2021 Shukla .................. G06V 20/70
2022/0015572 A1* 1/2022 Cottrell ................. G06V 20/00

OTHER PUBLICATIONS

"U.S. Appl. No. 15/829,572, Response filed Dec. 5, 2019 to Non Final Office Action dated Oct. 24, 2019", 12 pgs.
"U.S. Appl. No. 15/829,572, Notice of Allowance dated Dec. 30, 2019", 7 pgs.
"Surprise!", [Online] Retrieved from the Internet: <URL: https://www.snap.com/en-US/news/post/surprise>, (Oct. 3, 2013), 1 pg.
Buscemi, Scott, "Snapchat introduces 'Stories', a narrative built with snaps", [Online] Retrieved from the Internet:: <URL: https://9to5mac.com/2013/10/03/snapchat-introduces-stories-a-narrative-built-with-snaps/> (Oct. 3, 2013), 2 pgs.
Etherington, Darrell, "Snapchat Gets Its Own Timeline With Snapchat Stories, 24-Hour Photo and Video Tales", [Online] Retrieved from the Internet: <URL: https://techcrunch.com/2013/10/03/snapchat-gets-its-own-timeline-with-snapchat-stories-24-hour-photo-video-tales/> (Oct. 3, 2013), 2 pgs.
Hamburger, Ellis, "Snapchat's next big thing: 'Stories' that don't just disappear", [Online] Retrieved from the Internet: <URL: https://www.theverge.com/2013/10/3/4791934/snapchats-next-big-thing-stories-that-dont-just-disappear>, (Oct. 3, 2013), 5 pgs.

* cited by examiner

GENERATING DATA IN A MESSAGING SYSTEM FOR A MACHINE LEARNING MODEL

PRIORITY

This application is a continuation of and claims the benefit of priority of U.S. patent application Ser. No. 15/829,572, filed Dec. 1, 2017, which is hereby incorporated by reference herein in its entirety.

BACKGROUND

A content sharing platform may receive millions of messages from users desiring to share media content such as audio, images, and video between user devices (e.g., mobile devices, personal computers, etc.). The media content of these messages may be associated with a common geolocation, a common time period, a common event, and so forth.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
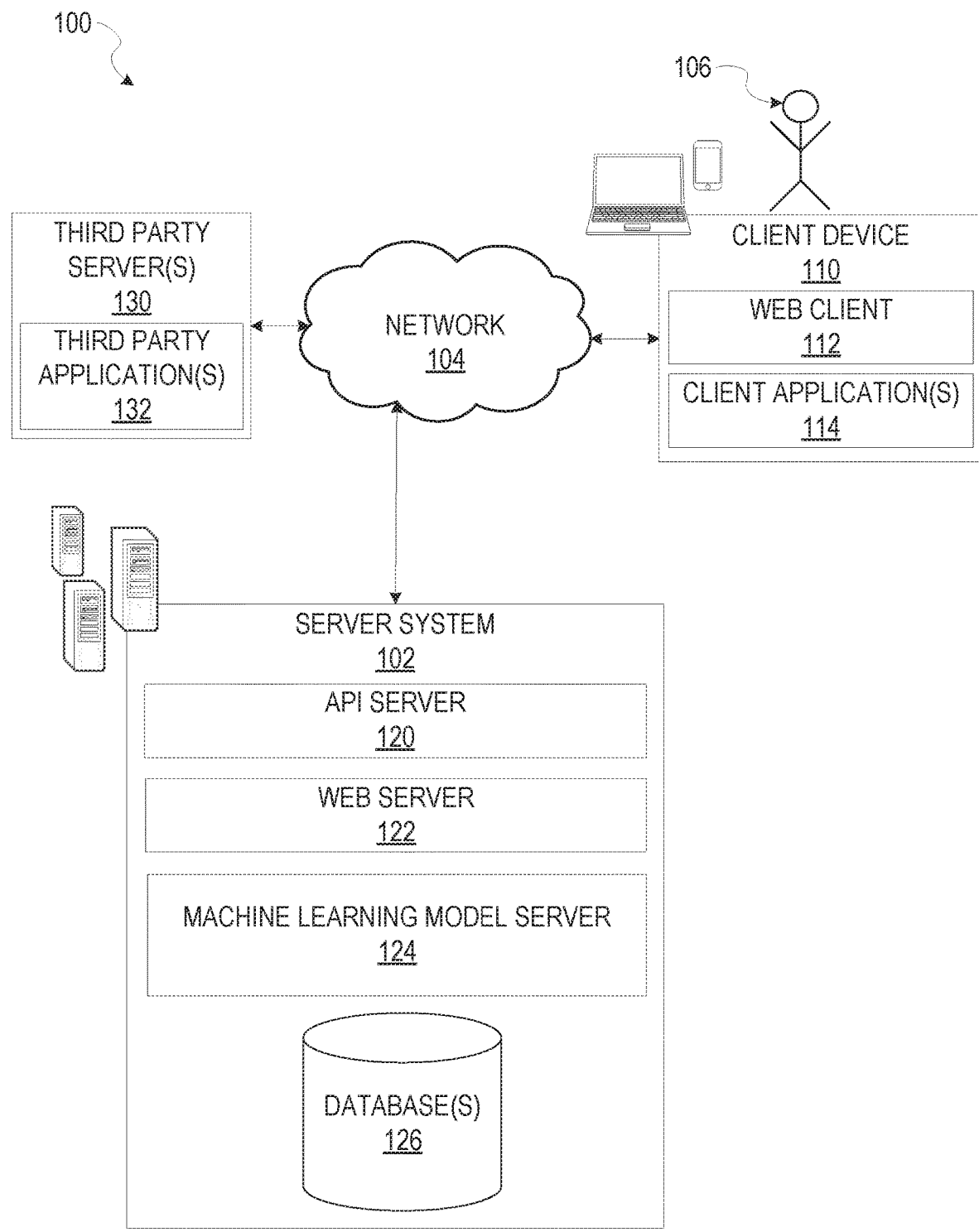
FIG. 1 is a block diagram illustrating a networked system, according to some example embodiments.

Systems and methods described herein relate to generating data (e.g., labeled data) in a messaging system for a machine learning model for object detection and identification in media content items, such as images. Example embodiments describe a machine learning model for food detection and identification, however, other machine learning models may be trained and implemented using examples described herein.

Machine learning may be used for identifying objects in images, such as people, cars, venues, food, and so forth. Collecting the amount of data necessary for an accurate model and manually labeling the data to train a machine learning model is incredibly time consuming and expensive. Moreover, it is difficult to get up-to-date images for training and updating the model. Furthermore, it may be difficult to process low-quality images taken by users of a messaging system, especially if data used to train the machine learning model is not representative of the images that will actually be input for prediction. For example, a user may take a photo of his daughter eating sushi to share with his family via a messaging system. The image may be in a dimly lit restaurant and the food in the photo may not be focused very well. If a machine learning model is trained on data containing images of food that have good lighting, are focused, and so forth, it will likely not be able to detect the food (e.g., sushi) in such an image and/or may not be able to accurately identify the food. Obtaining a large amount of data and labeling the data for images representative of those taken and shared via a messaging system may be challenging. Also, many subjects are constantly changing and being updated. For example, there are always new menu items and new food being created.

Accordingly, example embodiments provide systems and methods for generating machine learning training data (e.g., data and labels) in a messaging system and then using that data to train and update a machine learning model (e.g., a food detector machine learning model). For example, example embodiments cause users to capture images of food and submit additional data related to the images of food. These images (e.g., visual data) and additional data (e.g., labels of the visual data) may be used for initial and iterative training of a food detector machine learning model. Since a messaging system may have millions of daily active users, the messaging system may generate thousands of images per second, and thus a large quantity of images and data may be generated in a short amount of time. Example embodiments obtain such labeled visual data for machine learning, while not impeding the overall user experience of a user. Accordingly, up-to-date labeled data may be obtained for machine learning.

For example, a computing device may detect that a user is capturing an image via a messaging application. The computing device may determine (e.g., based on location data) that the image being captured is associated with a food-related venue or event (e.g., restaurant, farmer's market, etc.). The computing device may also use an existing food detector machine learning model to determine whether or not food is present in the image and optionally to identify the food. The computing device may present interactive features related to the venue or event to motivate the user to review the food the user is eating, review the restaurant, add a media overlay or other creative tool to the image, and so forth. This may be in the normal flow of the messaging application so that it does not disrupt the flow of the user in capturing images and sending messages with the images and any text, media overlays, or other creative tools. The image and data input by the user is stored in a database and is fed into a machine learning model to train the model to detect food and/or identify food in images and video for the messaging system. In this way, a plurality of images with associated data may be collected to initially train the machine learning model and then subsequently used to regularly update the machine learning model with the most current data. In one example, the data and labels may be used within a certain amount of time, and then deleted after a certain training is done.

FIG. 1 is a block diagram illustrating a networked system 100, according to some example embodiments. The system 100 may include one or more client devices such as a client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to create or generate messages comprising images (e.g., photographs), video, and/or text. The client device 110 may be a device of a user that is used to create and edit media overlays.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110, and the input may be communicated to other entities in the system 100 (e.g., third party servers 130, server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, and the like.

In some embodiments, one or more client applications 114 may be included in a given one of the client devices 110, and configured to locally provide the user interface and at least some of the functionalities, with the client application 114 configured to communicate with other entities in the system 100 (e.g., third party servers 130, server system 102, etc.), on an as-needed basis, for data and/or processing capabilities not locally available (e.g., to process user queries, to authenticate a user 106, to verify a method of payment, etc.). Conversely, one or more client applications 114 may not be included in the client device 110, and then the client device 110 may use its web browser to access the one or more applications hosted on other entities in the system 100 (e.g., third party servers 130, server system 102, etc.).

A server system 102 may provide server-side functionality via the network 104 (e.g., the Internet or a wide area network (WAN)) to one or more third party servers 130 and/or one or more client devices 110. The server system 102 may include an application programming interface (API) server 120, a web server 122, and a machine learning model server 124, which may be communicatively coupled with one or more databases 126.

The one or more databases 126 may be storage devices that store media overlays, smart widgets, messaging data, user data, computing device context data, media content (e.g., video and images), media content data (e.g., data associated with video and images), and other data. The one or more databases 126 may further store information related to third party servers 130, third party applications 132, client devices 110, client applications 114, users 106, and so forth. The one or more databases 126 may include cloud-based storage.

The server system 102 may be a cloud computing environment, according to some example embodiments. The server system 102, and any servers associated with the server system 102, may be associated with a cloud-based application, in one example embodiment.

The machine learning model server 124 may provide back-end support for third-party applications 132 and client applications 114, which may include cloud-based applications. In one embodiment, the machine learning model server 124 may receive data, such as media content (e.g., video and images) and media content data (e.g., data associated with video and images), from a plurality of client devices 110, store the data in one or more databases 126, train or update a machine learning model using the data, provide an updated machine learning model to one or more client applications 114 or third party applications 132, and so forth.

The system 100 may further include one or more third party servers 130. The one or more third party servers 130 may include one or more third party application(s) 132. The one or more third party application(s) 132, executing on the third party server(s) 130, may interact with the server system 102 via API server 120 via a programmatic interface provided by the API server 120. For example, one or more of the third party applications 132 may request and utilize information from the server system 102 via the API server 120 to support one or more features or functions on a website hosted by the third party or an application hosted by the third party. The third party website or application 132, for example, may provide functionality that is supported by relevant functionality and data in the server system 102.

Figure 2:
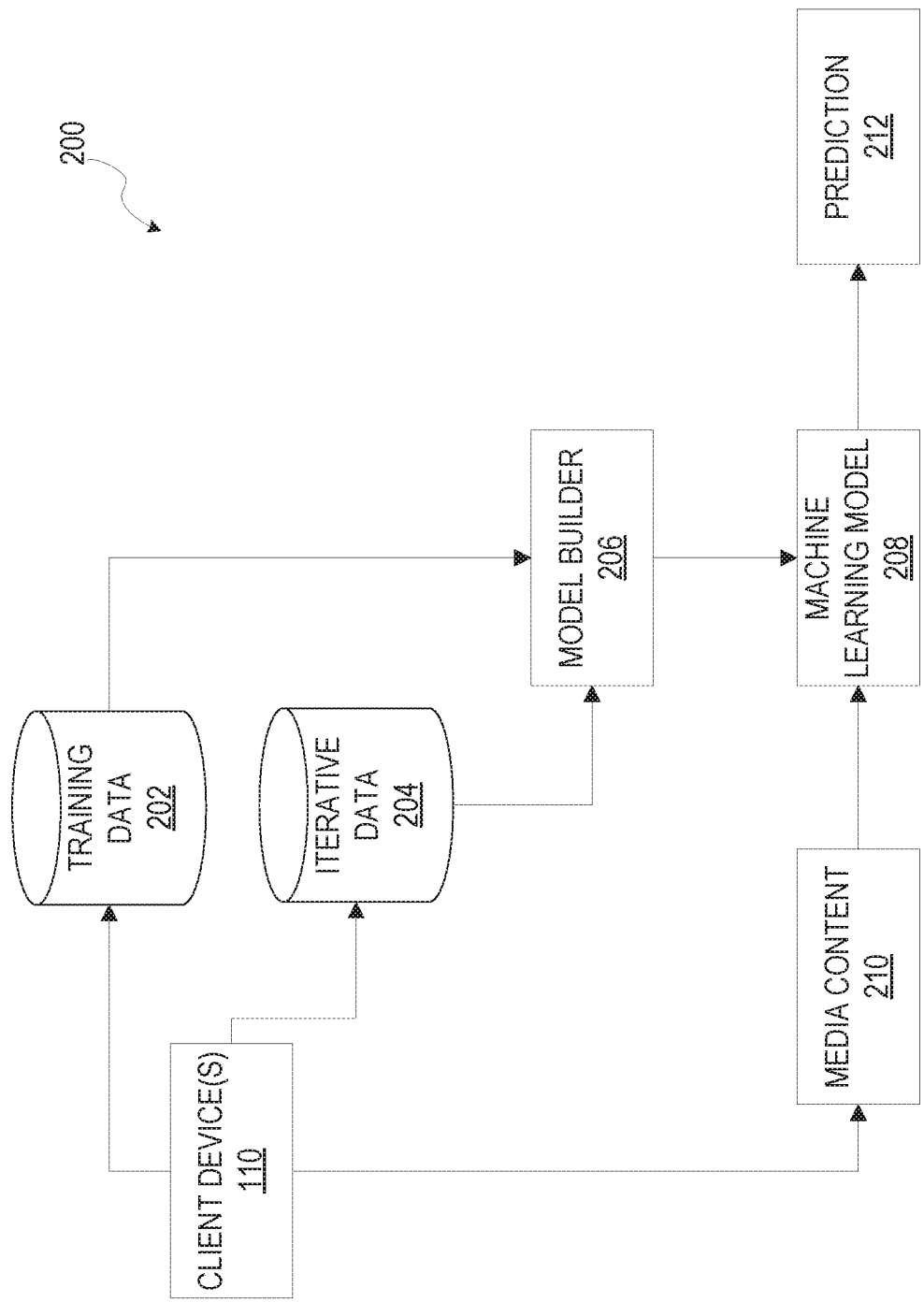
FIG. 2 is a flow diagram illustrating training, generating, and updating a machine learning model, according to some example embodiments.

FIG. 2 is a flow diagram 200 illustrating training, generating, and updating a machine learning model 208. As explained in further detail below, client devices 110 provide a plurality of data (e.g., media content and media content data) as input for training data 202 (e.g., for initial training of the machine learning model 208) and for iterative data 204 (e.g., for updating the machine learning model 208). This data (e.g., labeled visual data) is stored in one or more databases 202 and 204. The training data 202 is used by a model builder 206 to initially train the machine learning model 208. The iterative data 204 is used by the model builder 206 to update the machine learning model 208 with current data.

The machine learning model 208 is used by client devices 110 (e.g., as a function of an application running on the client device 110, such as a messaging application) for image detection. For example, a media content item 210 is input into the machine learning model 208 and the machine learning model 208 outputs a prediction 212 comprising the probability (e.g., between 0 and 1) that a specific subject is detected in the media content (e.g., food in a photograph) or the probability that the subject is of a certain class (e.g., the food is sushi or empanadas, the food is Korean food or Mexican food, etc.). For example, the machine learning model 208 may output a probability of 0.9 or 0.3 that a media content item 210 (e.g., an image) comprises food. In another example, the machine learning model 208 may output a probability for each of a plurality of classes of food (e.g., 0.2 Chinese. 0.1 Mexican, 0.7 Indian; 0.2 chow mein, 0.2 lo mein, 0.6 angel hair pasta; etc.).

The machine learning model 208 may be part of a server system (e.g., server system 102 or server system 308) and/or the machine learning model 208 may reside on a client device 110 as a function of an application running on the client device 110. For example, the machine learning model 208 may reside entirely on a client device 110 and the client device 110 may manage functionality of the machine learning model 208. In another example, the machine learning model 208 may reside on a server system and the client device 110 may make requests to the server system to request a prediction for a media content item 210. For example, the client device 110 may send a media content item 210 to the server system, and the server system may input the media content item 210 into the machine learning model 208 and return a prediction 212 to the client device 110. The client device 110 may receive the prediction 212 and use the prediction 212 for further functionality on the client device 110. In yet another example, portions of the machine learning model functionality may reside on both the client device 110 and the server system.

Figure 3:
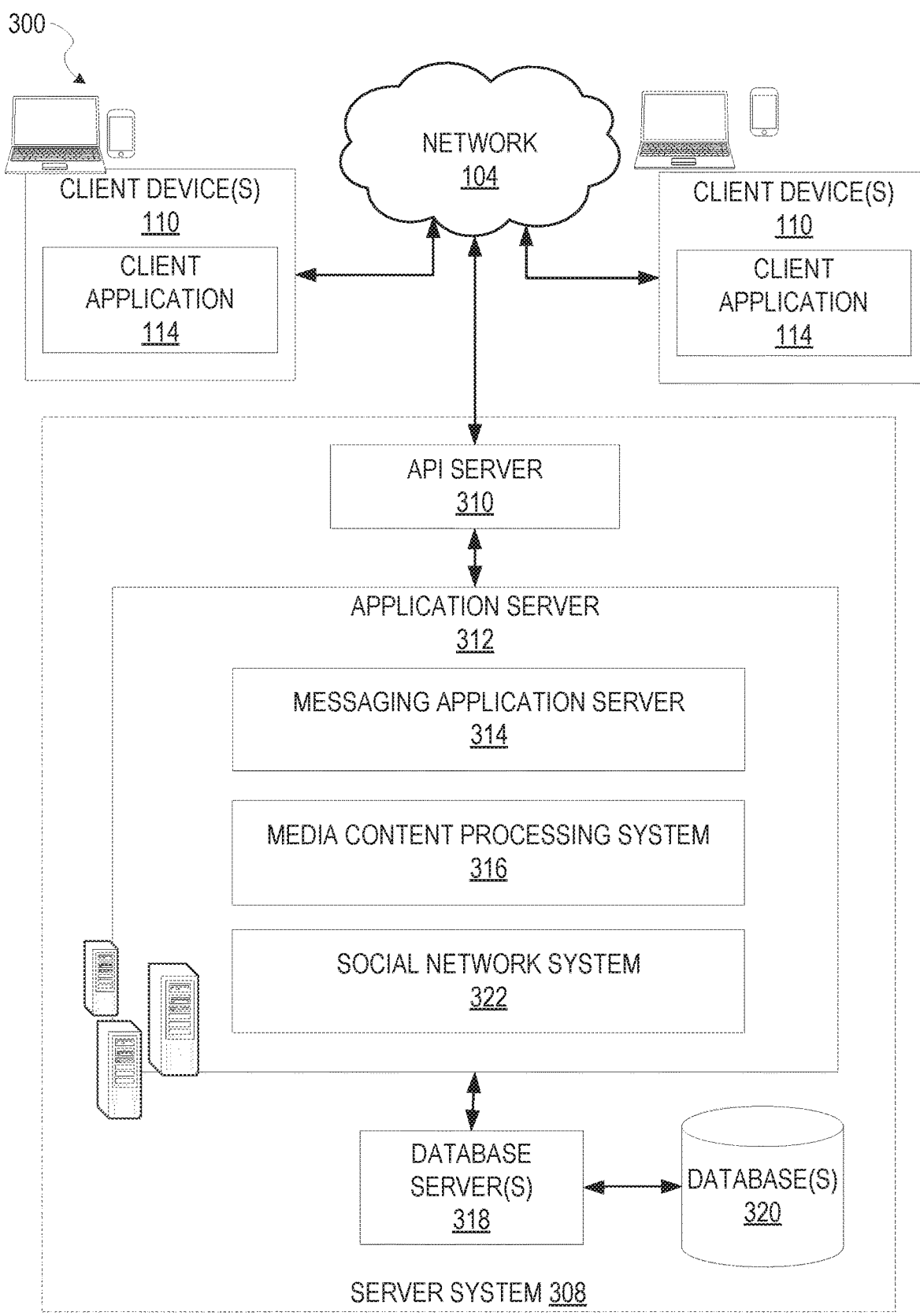
FIG. 3 is a block diagram showing an example messaging system for exchanging data (e.g., messages and associated content) over a network, according to some example embodiments.

FIG. 3 is a block diagram illustrating a networked system 300 (e.g., a messaging system) for exchanging data (e.g., messages and associated content) over a network. The networked system 300 includes multiple client devices 110, each of which hosts a number of client applications 114. Each client application 114 is communicatively coupled to other instances of the client application 114 and a server system 308 via a network 104.

The client device 110, client application 114, and network 104 are described above with respect to FIG. 1. The client device 110 may be a device of a user that is used to create media content items such as video, images (e.g., photographs), and audio, and to send and receive messages containing such media content items to and from other users.

In one example, a client application 114 may be a messaging application that allows a user to take a photograph or video, add a caption or otherwise edit the photograph or video, and then send the photograph or video to another user. In one example, the message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video, and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection. A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event, etc.), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The server system 308 may provide server-side functionality via the network 104 (e.g., the Internet or a wide area network (WAN)) to one or more client devices 110. The server system 308 may include an application programming interface (API) server 310, an application server 312, a messaging application server 314, a media content processing system 316, and a social network system 322, which may each be communicatively coupled with each other and with one or more data storage(s), such as database(s) 320. The server system 308 may also comprise the server system 102 of FIG. 1 or at least the machine learning model server 124 of FIG. 1.

The server system 308 may be a cloud computing environment, according to some example embodiments. The server system 308, and any servers associated with the server system 308, may be associated with a cloud-based application, in one example embodiment. The one or more database(s) 320 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., computing or client device 110), media overlays, media overlay smart widgets or smart elements, user information, user device information, media content (e.g., video and images), media content data (e.g., data associated with video and images), and so forth. The one or more database(s) 320 may include cloud-based storage external to the server system 308 (e.g., hosted by one or more third-party entities external to the server system 308). While the storage devices are shown as database(s) 320, it is to be understood that the system 300 may access and store data in storage devices such as databases 320, blob storages, and other types of storage methods.

Accordingly, each client application 114 is able to communicate and exchange data with other client applications 114 and with the server system 308 via the network 104. The data exchanged between client applications 114, and between a client application 114 and the server system 308, includes functions (e.g., commands to invoke functions) as well as payload data (e.g., text, audio, video, or other multimedia data).

The server system 308 provides server-side functionality via the network 104 to a particular client application 114. While certain functions of the system 300 are described herein as being performed by either a client application 114 or by the server system 308, it will be appreciated that the location of certain functionality either within the client application 114 or within the server system 308 is a design choice. For example, it may be technically preferable to initially deploy certain technology and functionality within the server system 308, but to later migrate this technology and functionality to the client application 114 where a client device 110 has a sufficient processing capacity.

The server system 308 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), and media content data (e.g., data associated with video and images), as examples. Data exchanges within the networked system 300 are invoked and controlled through functions available via user interfaces (UIs) of the client application 114.

In the server system 308, the API server 310 is coupled to, and provides a programmatic interface to, the application server 312. The application server 312 is communicatively coupled to a database server 318, which facilitates access to the one or more database(s) 320 in which is stored data associated with messages processed by the application server 312.

The API server 310 receives and transmits message data (e.g., commands and message payloads) between the client device 110 and the application server 312. Specifically, the API server 310 provides a set of interfaces (e.g., routines and protocols) that can be called or queried by the client application 114 in order to invoke functionality of the application server 312. The API server 310 exposes various functions supported by the application server 312, including account registration; login functionality; the sending of messages, via the application server 312, from a particular client application 114 to another client application 114; the sending of media files (e.g., images or video) from a client application 114 to the messaging application server 314, for possible access by another client application 114; the setting of a collection of media data (e.g., a gallery, story, message collection, or media collection); the retrieval of a list of friends of a user of a client device 110; the retrieval of such collections; the retrieval of messages and content; the adding of friends to and deletion of friends from a social graph; the location of friends within a social graph; opening an application event (e.g., relating to the client application 114); and so forth.

The application server 312 hosts a number of applications and subsystems, including the messaging application server 314, the media content processing system 316, and the social network system 322. The messaging application server 314 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called stories or galleries). These collections are then made available, by the messaging application server 314, to the client application 114. Other processor- and memory-intensive processing of data may also be performed server-side by the messaging application server 314, in view of the hardware requirements for such processing.

The application server 312 also includes the media content processing system 316, which is dedicated to performing various media content processing operations, typically with respect to images or video received within the payload of a message at the messaging application server 314. The media content processing system 316 may access one or more data storages (e.g., database(s) 320) to retrieve stored data to use in processing media content and to store results of processed media content.

The social network system 322 supports various social networking functions and services, and makes these functions and services available to the messaging application server 314. To this end, the social network system 322 maintains and accesses an entity graph 504 (depicted in FIG. 5) within the database 320. Examples of functions and services supported by the social network system 322 include the identification of other users of the networked system 300 with whom a particular user has relationships or whom the particular user is "following," and also the identification of other entities and interests of a particular user.

The messaging application server 314 may be responsible for generation and delivery of messages between users of client devices 110. The messaging application server 314 may utilize any one of a number of message delivery networks and platforms to deliver messages to users. For example, the messaging application server 314 may deliver messages using electronic mail (email), instant message (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

Figure 4:
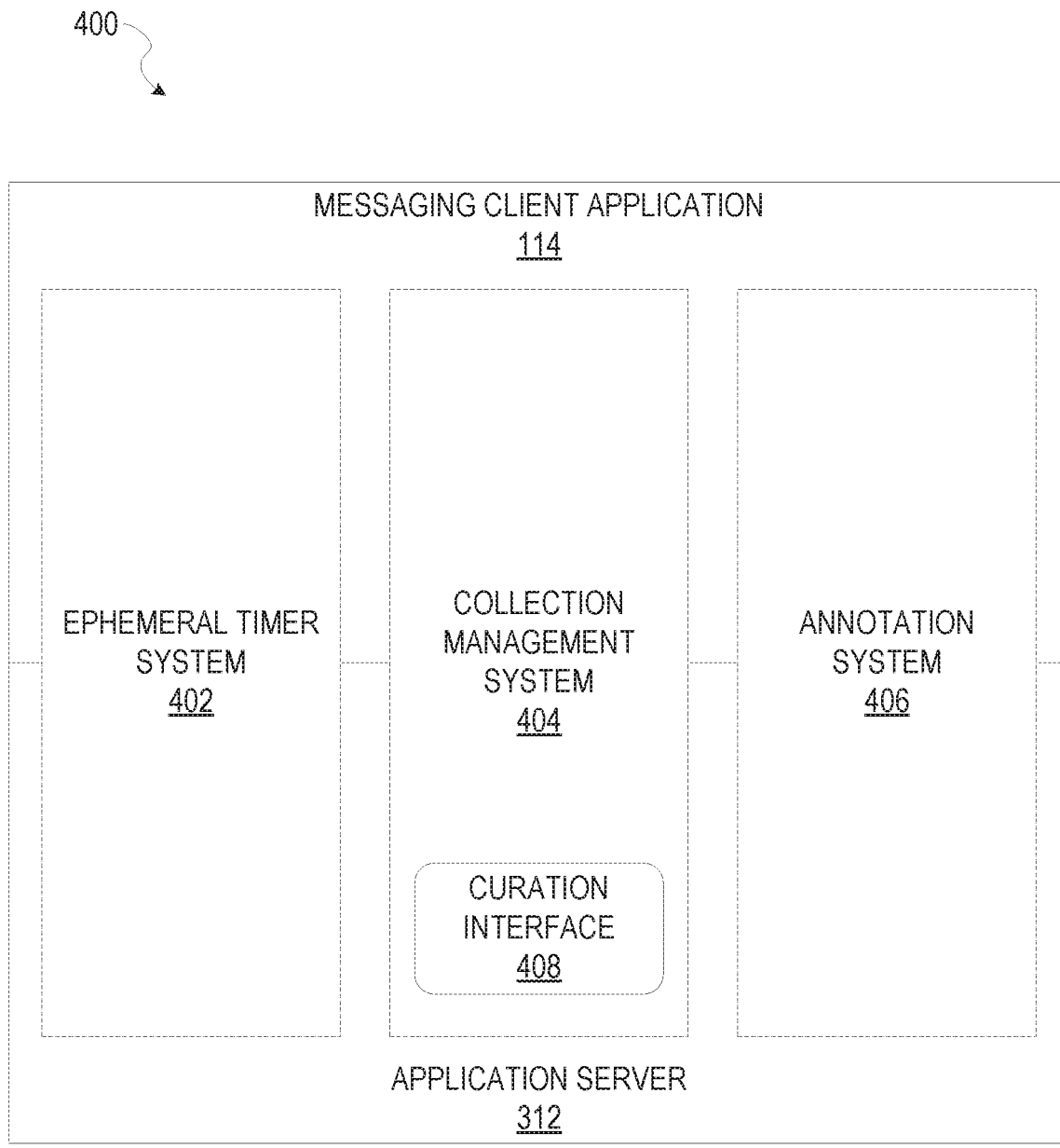
FIG. 4 is a block diagram illustrating further details regarding the messaging system, according to some example embodiments.

FIG. 4 is a block diagram 400 illustrating further details regarding the system 300, according to example embodiments. Specifically, the system 400 is shown to comprise the messaging client application 114 and the application server 312, which in turn embody a number of subsystems, namely an ephemeral timer system 402, a collection management system 404, and an annotation system 406.

The ephemeral timer system 402 is responsible for enforcing the temporary access to content permitted by the messaging client application 114 and the messaging application server 314. To this end, the ephemeral timer system 402 incorporates a number of timers that, based on duration and display parameters associated with a message, or collection of messages (e.g., otherwise referred to herein as media collections, galleries, message collections, stories, and the like), selectively display and enable access to messages and associated content via the messaging client application 114.

The collection management system 404 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "Story" for the duration of that music concert. The collection management system 404 may also be responsible for publishing an icon that provides notification of the existence of a particular collection to the user interface of the messaging client application 114.

The collection management system 404 furthermore includes a curation interface 408 that allows a collection manager to manage and curate a particular collection of content. For example, the curation interface 408 enables an event organizer to curate a collection of content relating to a specific event (e.g., delete inappropriate content or redundant messages). Additionally, the collection management system 404 employs machine vision (or image recognition technology) and content rules to automatically curate a content collection. In certain embodiments, compensation (e.g., money, non-money credits or points associated with the messaging system or a third party reward system, travel miles, access to artwork or specialized lenses, etc.) may be paid to a user for inclusion of user-generated content into a collection. In such cases, the curation interface 408 operates to automatically make payments to such users for the use of their content.

The annotation system 406 provides various functions that enable a user to annotate or otherwise modify or edit media content associated with a message. For example, the annotation system 406 provides functions related to the generation and publishing of media overlays for messages processed by the networked system 300. In one example, the annotation system 406 operatively supplies a media overlay (e.g., a filter or media augmentation) to the messaging client application 114 based on a geolocation of the client device 110. In another example, the annotation system 406 operatively supplies a media overlay to the messaging client application 114 based on other information, such as social network information of the user of the client device 110. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay includes text that can be overlaid on top of a photograph taken by the client device 110. In another example, the media overlay includes an identification of a location overlay (e.g., Venice Beach), a name of a live event, or a name of a merchant overlay (e.g., Beach Coffee House). In another example, the annotation system 406 uses the geolocation of the client device 110 to identify a media overlay that includes the name of a merchant at the geolocation of the client device 110. The media overlay may include other indicia associated with the merchant. The media overlays may be stored in the database 320 and accessed through the database server 318.

In one example embodiment, the annotation system 406 provides a user-based publication platform that enables users to select a geolocation on a map, and upload content associated with the selected geolocation. The user may also specify circumstances under which a particular media overlay is to be offered to other users. The annotation system 406 generates a media overlay that includes the uploaded content and associates the uploaded content with the selected geolocation.

In another example embodiment, the annotation system 406 provides a merchant-based publication platform that enables merchants to select a particular media overlay associated with a geolocation via a bidding process. For example, the annotation system 406 associates the media overlay of a highest bidding merchant with a corresponding geolocation for a predefined amount of time.

In another example embodiment, the annotation system 406 provides interactive features to capture input by a user related to a subject associated with a media content item captured by the user. For example, the annotation system 406 may provide interactive features (e.g., a media overlay, a request for a review, etc.) to cause a user to input data related to food associated with media content, as described in further detail below.

Figure 5:
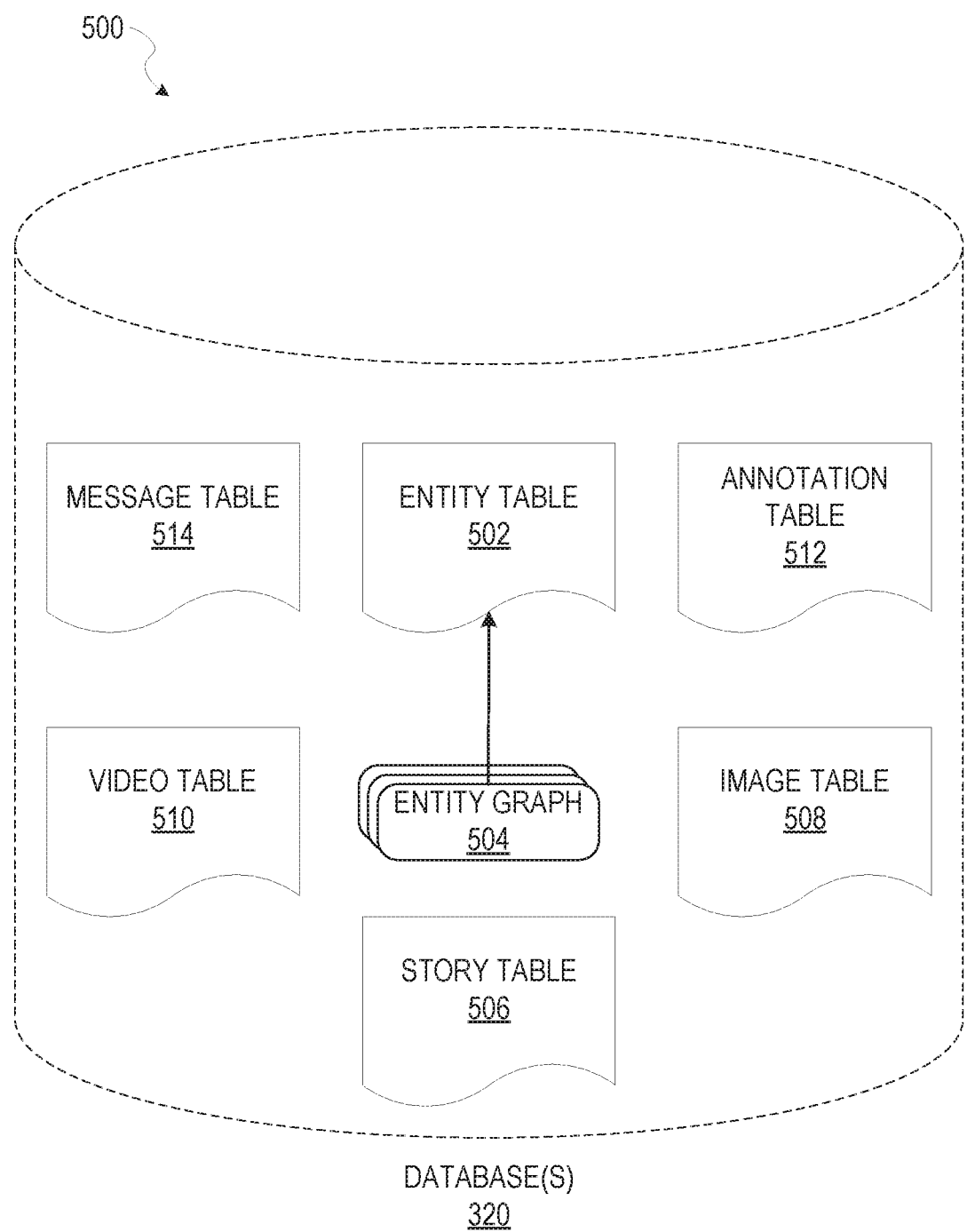
FIG. 5 is a schematic diagram illustrating data which may be stored in a database of a messaging server system, according to some example embodiments.

FIG. 5 is a schematic diagram 500 illustrating data which may be stored in the database(s) 320 of the server system 308, according to certain example embodiments. While the content of the database 320 is shown to comprise a number of tables, it will be appreciated that the data could be stored in other types of data structures (e.g., as an object-oriented database).

The database 320 includes message data stored within a message table 514. An entity table 502 stores entity data, including an entity graph 504. Entities for which records are maintained within the entity table 502 may include individuals, corporate entities, organizations, objects, places, events, etc. Regardless of type, any entity regarding which the server system 308 stores data may be a recognized entity. Each entity is provided with a unique identifier, as well as an entity type identifier (not shown).

The entity graph 504 furthermore stores information regarding relationships and associations between entities. Such relationships may be social, professional (e.g., work at a common corporation or organization), interested-based, or activity-based, merely for example.

The database 320 also stores annotation data, in the example form of media overlays or filters, in an annotation table 512. Annotation data may also be referred to herein as "creative tools" or "interactive features." Media overlays or filters, for which data is stored within the annotation table 512, are associated with and applied to videos (for which data is stored in a video table 510) and/or images (for which data is stored in an image table 508). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 512 is so-called "lens" data. A "lens" may be a real-time special effect and sound that may be added to an image or a video.

As mentioned above, the video table 510 stores video data which, in one embodiment, is associated with messages for which records are maintained within the message table 514. Similarly, the image table 508 stores image data associated with messages for which message data is stored in the message table 514. The entity table 502 may associate various annotations from the annotation table 512 with various images and videos stored in the image table 508 and the video table 510.

A story table 506 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 502). A user may create a "personal story" in the form of a collection of content that has been created and sent/broadcast by that user. To this end, the user interface of the messaging client application 114 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 6:
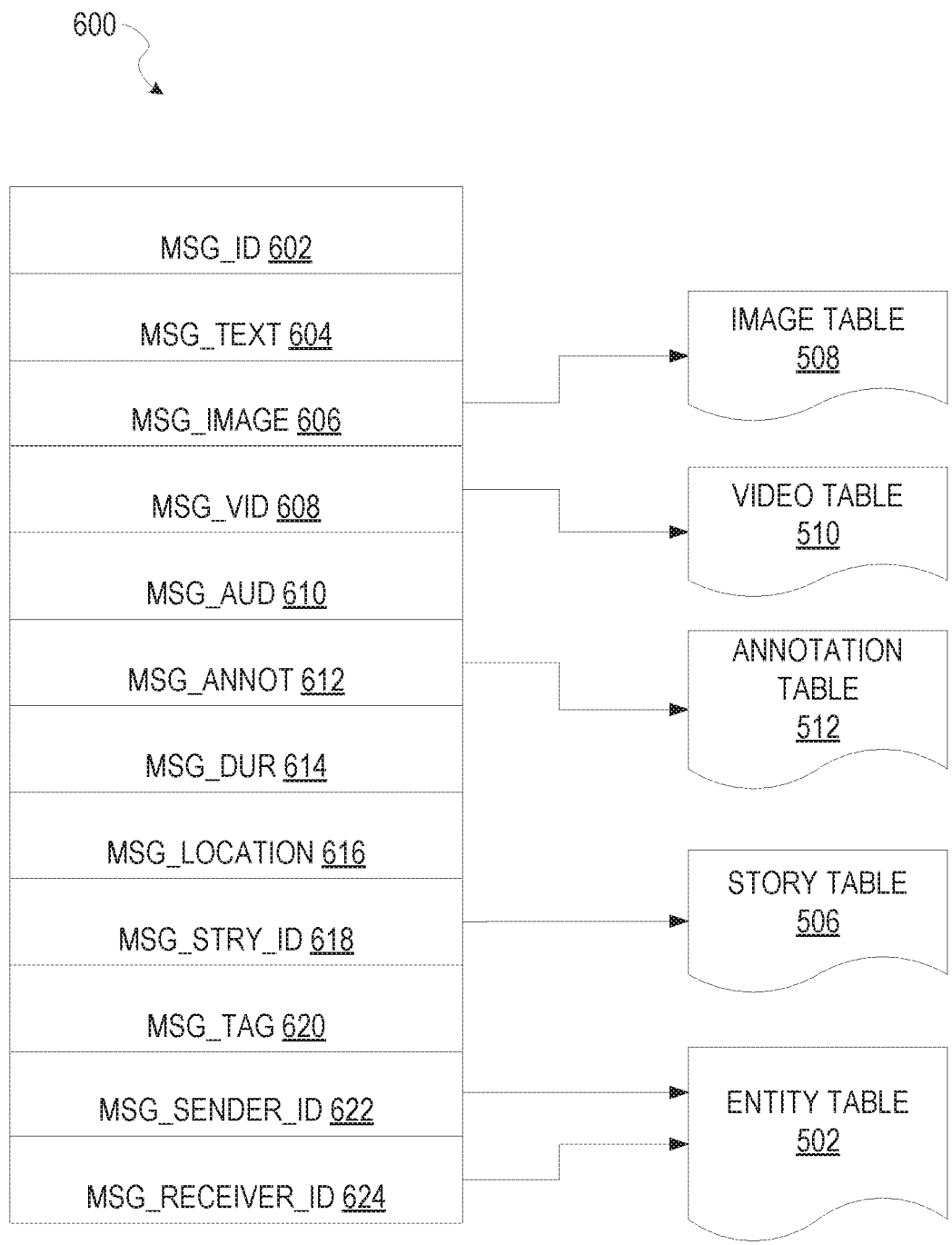
FIG. 6 is a schematic diagram illustrating a structure of a message, according to some embodiments, generated by a messaging client application for communication.

FIG. 6 is a schematic diagram illustrating a structure of a message 600, according to some embodiments, generated by a client application 114 for communication to a further client application 114 or the messaging application server 314. The content of a particular message 600 is used to populate the message table 514 stored within the database 320, accessible by the messaging application server 314. Similarly, the content of a message 600 is stored in memory as "in-transit" or "in-flight" data of the client device 110 or the application server 312. The message 600 is shown to include the following components:

A message identifier 602: a unique identifier that identifies the message 600.

A message text payload 604: text, to be generated by a user via a user interface of the client device 110 and that is included in the message 600.

A message image payload 606: image data, captured by a camera component of a client device 110 or retrieved from memory of a client device 110, and that is included in the message 600.

A message video payload 608: video data, captured by a camera component or retrieved from a memory component of the client device 110 and that is included in the message 600.

A message audio payload 610: audio data, captured by a microphone or retrieved from the memory component of the client device 110, and that is included in the message 600.

A message annotations 612: annotation data (e.g., media overlays such as filters, stickers, or other enhancements) that represents annotations to be applied to the message image payload 606, message video payload 608, or message audio payload 610 of the message 600.

A message duration parameter 614: a parameter value indicating, in seconds, the amount of time for which content of the message 600 (e.g., the message image payload 606, message video payload 608, message audio payload 610) is to be presented or made accessible to a user via the messaging client application 114.

A message geolocation parameter 616: geolocation data (e.g., latitudinal and longitudinal coordinates) associated with the content payload of the message 600. Multiple message geolocation parameter 616 values may be included in the payload, each of these parameter values being associated with respect to content items included in the content (e.g., a specific image within the message image payload 606, or a specific video in the message video payload 608).

A message story identifier 618: identifier values identifying one or more content collections (e.g., "stories") with which a particular content item in the message image payload 606 of the message 600 is associated. For example, multiple images within the message image payload 606 may each be associated with multiple content collections using identifier values.

A message tag 620: each message 600 may be tagged with multiple tags, each of which is indicative of the subject matter of content included in the message payload. For example, where a particular image included in the message image payload 606 depicts an animal (e.g., a lion), a tag value may be included within the message tag 620 that is indicative of the relevant animal. Tag values may be generated manually, based on user input, or may be automatically generated using, for example, image recognition.

A message sender identifier 622: an identifier (e.g., a messaging system identifier, email address, or device identifier) indicative of a user of the client device 110 on which the message 600 was generated and from which the message 600 was sent.

A message receiver identifier 624: an identifier (e.g., a messaging system identifier, email address, or device identifier) indicative of a user of the client device 110 to which the message 600 is addressed.

The contents (e.g., values) of the various components of the message 600 may be pointers to locations in tables within which content data values are stored. For example, an image value in the message image payload 606 may be a pointer to (or address of) a location within an image table 508. Similarly, values within the message video payload 608 may point to data stored within a video table 510, values stored within the message annotations 612 may point to data stored in an annotation table 512, values stored within the message story identifier 618 may point to data stored in a story table 506, and values stored within the message sender identifier 622 and the message receiver identifier 624 may point to user records stored within an entity table 502.

Figure 7:
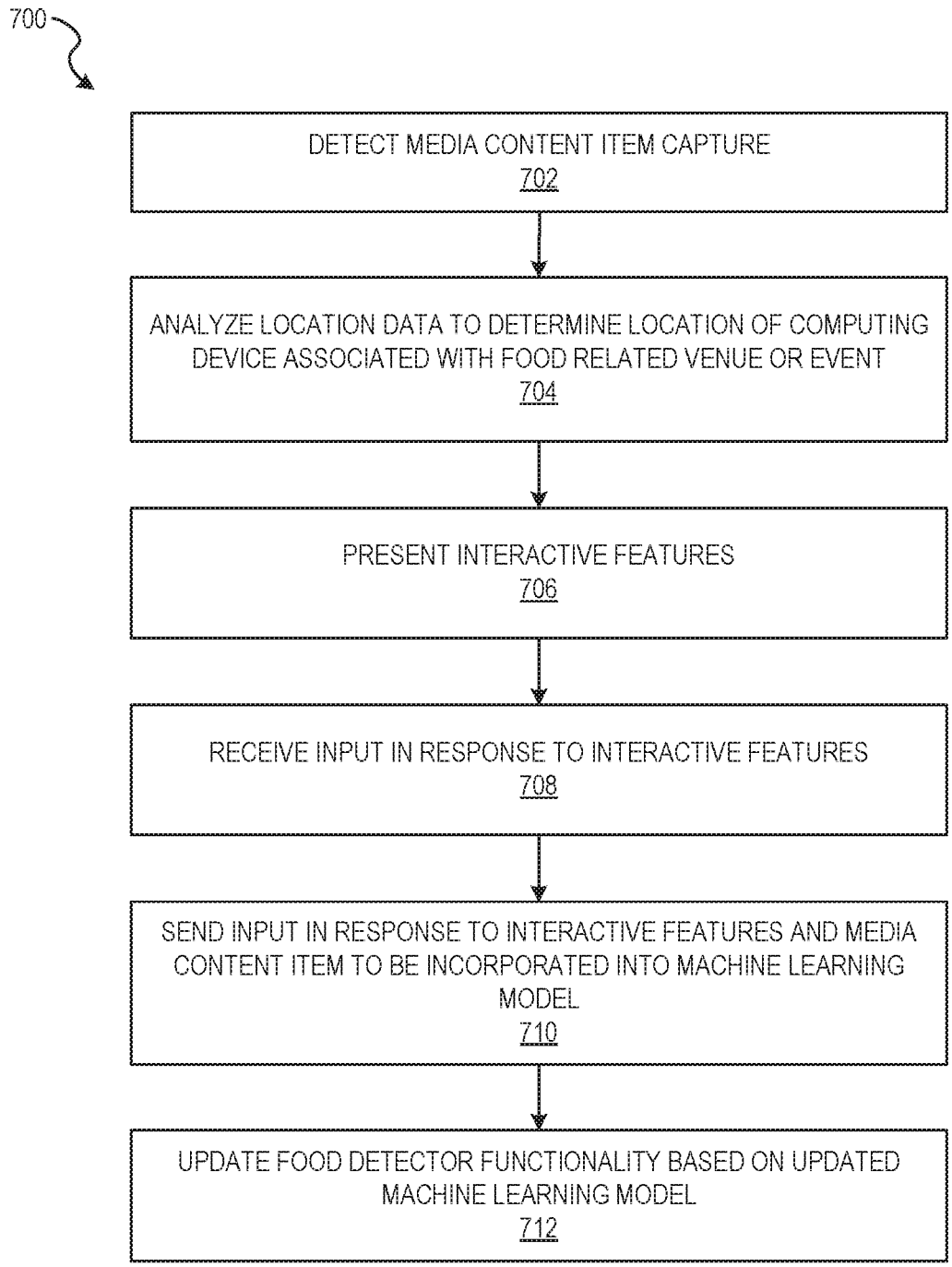
FIG. 7 is a flow chart illustrating aspects of a method, according to some example embodiments.

FIG. 7 is a flow chart illustrating aspects of a method 700, according to some example embodiments. For illustrative purposes, the method 700 is described with respect to the networked system 100 of FIG. 1, the server system 308 of FIG. 3, and the flow diagram 200 of FIG. 2. It is to be understood that the method 700 may be practiced with other system configurations in other embodiments.

In operation 702, a computing device (e.g., client device 110) detects that a media content item is being captured on the computing device. For example, a user may be using a messaging application on his or her computing device that allows him or her to capture an image (e.g., photograph) or video using the camera of the computing device and send the image or video to another user. The computing device may detect that a content item is being captured based on input from the user such as via a touch display, menu items in an application, buttons on the computing device, and the like. For example, the user may press an item on a display screen (e.g., a "button" on a touch screen display) to capture an image or video. In another example, the computing device may detect that the user is opening or has opened a camera application. Thus, the computing device detects capture of a media content item.

In operation 704, the computing device may analyze location data associated with a location of the computing device to determine that the media content item is being captured near a food-related venue or event. Location data may comprise GPS data, cellular network data (e.g., associating a computing device with the location of a cellular tower). WIFI network data (e.g., associating the computing device with nearby access points), sensor data such as compass (or magnetometer) data, accelerometer data, gyroscope data, barometric data, ultrasonic data (e.g., radio-frequency identification (RFID), near-field communication (NFC), etc.), Bluetooth data, and the like. For example, the computing device may comprise a GPS receiver that may be used to determine GPS coordinates of the computing device. In another example, the computing device may determine location information based on location relative to one or more cellular towers. The computing device may utilize one or more of these technologies (or other technologies) to determine location data.

In one example, the computing device may analyze the location data and compare the location data to map data and/or event calendar data to determine that the location of the computing device is near a food-related venue or event. For example, the computing device may compare GPS coordinates with map data to determine that the location of the computing device is near a particular restaurant. The computing device may also determine from event calendar data (e.g., a calendar of events local to the location of the computing device) that the location of the computing device is near a location for a food event, such as a farmer's market.

In one example, the computing device may also determine whether or not the media content item being captured comprises food using a trained machine learning model for food detection. In another example, the computing device may further determine a type of food in the media content item being captured. As explained above, the computing device may input the captured media content item 210 into the machine learning model 208, and the machine learning model 208 may output a prediction 212 comprising the probability (e.g., between 0 and 1) that a specific subject is detected in the media content item 210 (e.g., food in a photograph) or the probability that the subject is of a certain class (e.g., the food is sushi or empanadas, the food is Korean food or Mexican food, etc.). The machine learning model 208 may be part of a server system (e.g., server system 102 or server system 308) and/or the machine learning model 208 may reside on a client device 110 as a function of an application running on the client device 110.

The computing device may use the probability of whether or not the media content item comprises food, or what type of food is depicted in the media content item, to determine whether to present interactive features and/or to determine which interactive features to present, as explained below.

In operation 706, the computing device presents interactive features to capture input by a user of the computing device related to food associated with the food-related venue or event. For example, the determination that the computing device is near a food-related venue or event may trigger one or more creative tools, such as a media overlay, lens, request for review, and so forth. Also, a determination that the media content item comprises food or does not comprise food, or comprises a certain type of food, may trigger one or more creative tools. The interactive features are creative tools or requests that encourage a user to input data related to the food-related venue or event.

One example is an interactive feature that prompts a user to take a photo or video of what the user (or a companion of the user) is eating or seeing in the food-related venue or event. For example, the computing device may determine that no food is detected in the media content item and prompt the user to take a photo of food at the food-related venue or event.

Another example of an interactive feature is a request that the user review the food at the food-related venue or event (e.g., "How is lunch?" or "Rate your food." or a food emoji with a bar on the side where users may scribble the score or stars expressing their feelings about food). Another example of an interactive feature is a prompt for the user to enter information about the food detected in the captured media content item in return for a new creative tool.

Yet another example of an interactive feature is a challenge or media collection on a particular topic. For example, a challenge may be presented to the user to encourage the user to capture more media content items related to a particular topic. For example, a topic may be "strange food" and may encourage the user to take pictures of strange food that the user has eaten or is eating. Another challenge may be for a user to visit different types of restaurants in a given period and to submit photos of food and comments for each restaurant. Another challenge may be to encourage users to take photos of food that they have cooked. Images (or a subset of images) submitted in the challenge by users may be shared with all of the users who participated in the challenge (e.g., as a media collection, as explained above). The challenge or media collection may be only for a particular location or for a particular type of food, and so forth. For example, the computing system may determine that there is not enough data on a particular type of food (e.g., Nepalese food) or on food in a certain geographic location (e.g., Sydney, Australia), and may focus challenges or media collections to cause users to submit more data for those subjects or locations that need more data. In a messaging system there may be thousands of messages sent per second, comprising images and data associated with the images. Accordingly, the computing system may quickly generate significant data for initial or iterative training of the machine learning model. Each message comprising a media content item and optionally text or creative tools is sent to the computing system (e.g., server system 102 or 308) and added to the media collection by the computing system. The media collection is provided to one or more of a plurality of users in response to a request from one or more computing devices to view and access the media collection.

Another example of an interactive feature is to provide options for creative tools based on menu items for a particular food-related venue. For example, the computing device may determine that the location is near a particular restaurant. The computing device may determine that it has access to one or more menu items for the particular restaurant, each of which has a creative tool associated with it. For example, the menu items may include dumplings, green onion pancakes, and chow mein. Each of these menu items may have a creative tool associated with it (e.g., a media overlay for each menu item). The computing device may present a selection of creative tools that comprise a creative tool for each menu item. The user may choose the menu item relevant to the image or video the user is capturing. This data may then be used to identify the food in the image (e.g., for initial or iterative training of the machine learning model).

Figure 8:
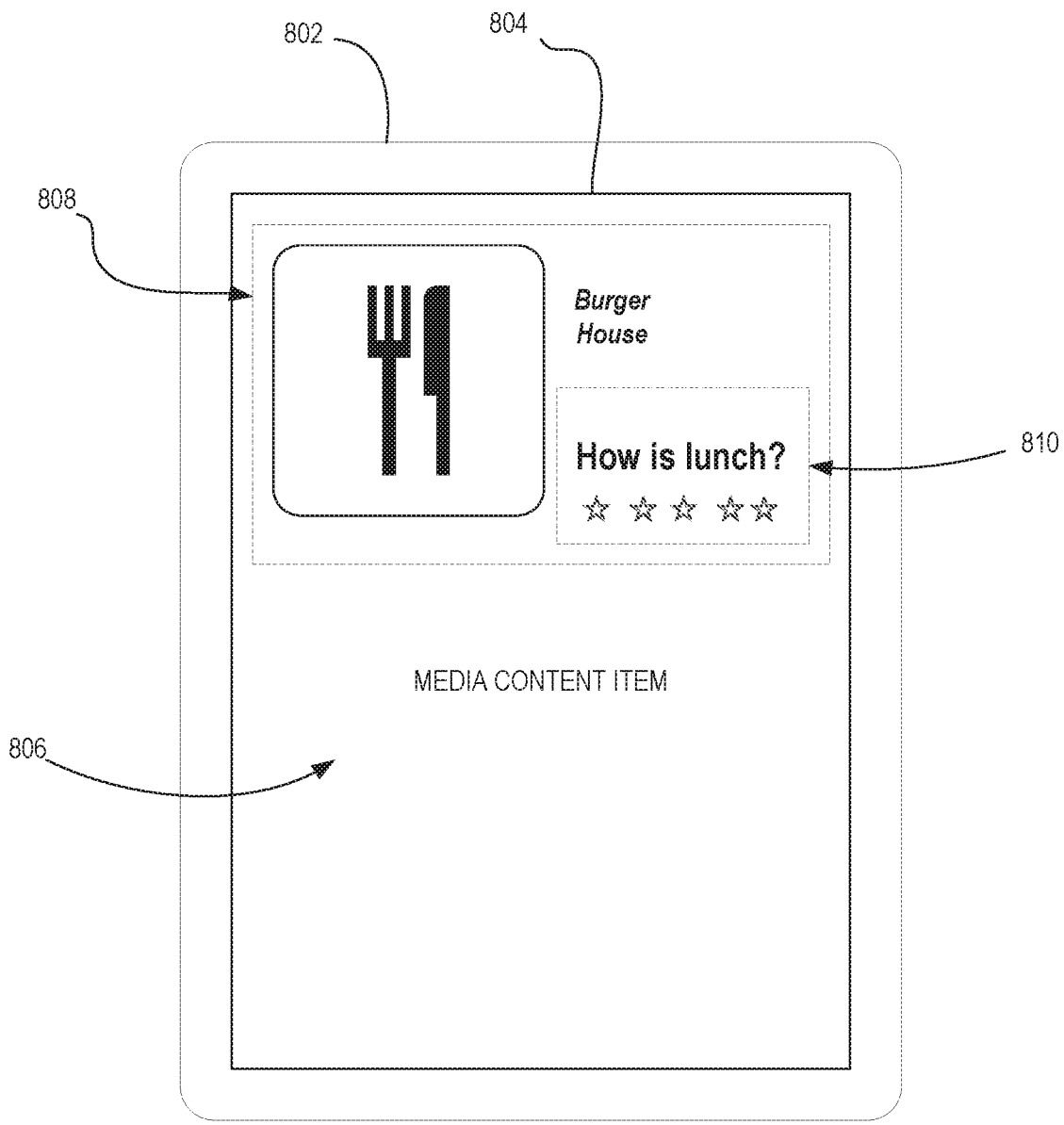
FIGS. 8-9 each illustrate an example graphical user interface, according to some example embodiments.
Figure 9:
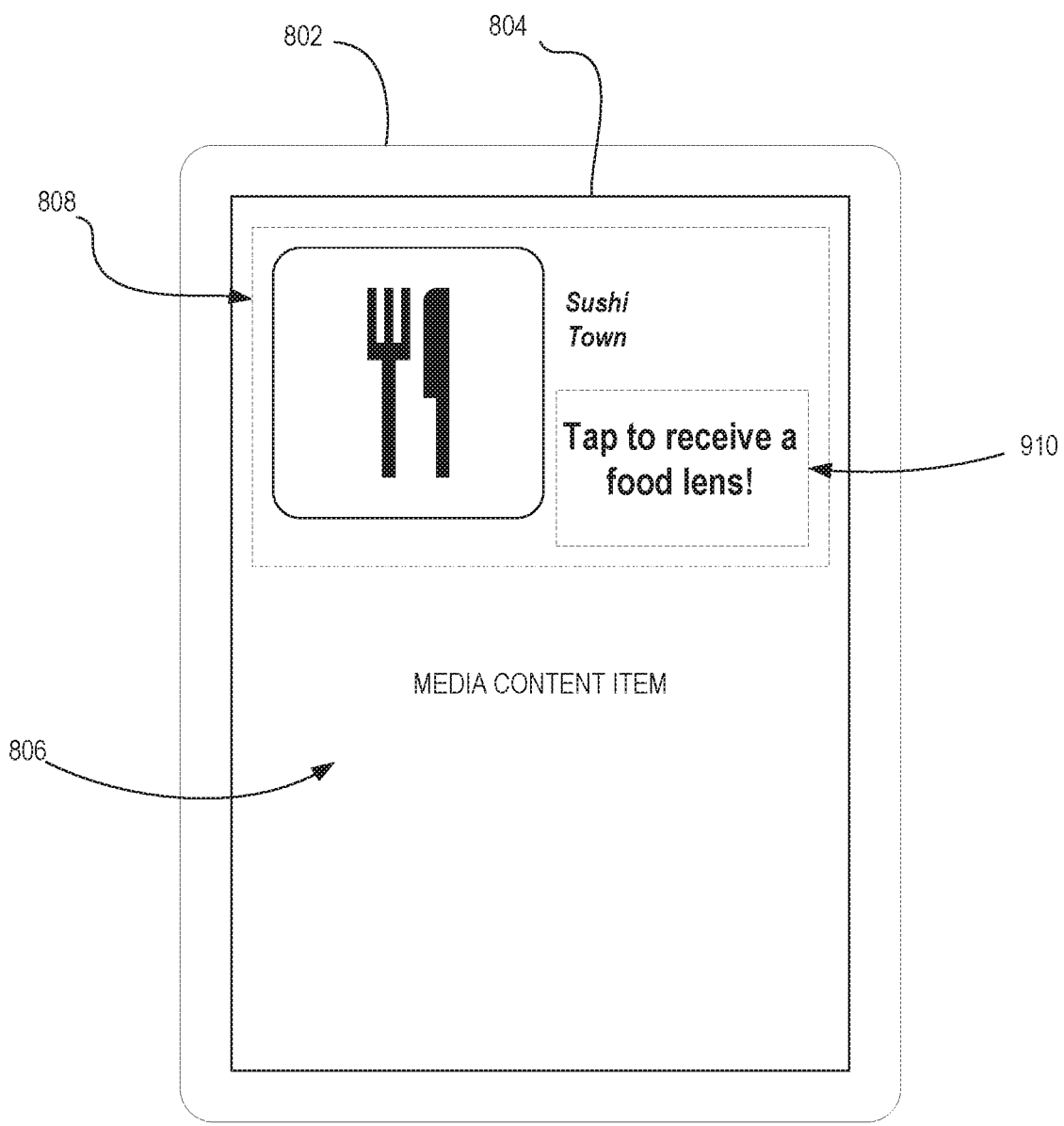

Some examples of interactive features are shown in FIG. 8 and FIG. 9. FIG. 8 illustrates an example device 802, with a display 804. The media content item 806 being captured or captured by the user may appear on the display 804. The computing device 802 may further display 808 the name of the food-related venue (e.g., "Burger House") and/or an icon representing the food-related venue, and a request 810 to rate the food the user ate for lunch. FIG. 9 illustrates another example interactive feature where a user is prompted to tap to receive a food-related creative tool 910 (e.g., a "lens" in this example). These, and other, interactive features may cause a user to input data related to the food-related venue or event.

Returning to FIG. 7, in operation 708, the computing device receives input from the user in response to the interactive feature(s) presented to the user. For example, the computing device may receive text input by the user about the food the user is eating or the food-related venue or event, a number of stars or other feedback about the food-related venue or event, input as part of a creative tool, a photograph of food at the food-related venue or event, and so forth. The input may be one or more of these examples or another type of input.

In operation 710, the computing device sends a captured media content item (e.g., the media content item that was being captured by the user or a media content item captured by a user in response to an interactive feature), and the input from the user in response to the interactive features, to a computing system (e.g., server system 102 or server system 308) to be incorporated into a machine learning model for food detection and/or a machine learning model for a type of food captured.

The computing system receives the media content item and the input from the user in response to the interactive features. The computing device stores the media content item and the input from the user in response to the interactive features in one or more databases (e.g., database(s) 126, training data 202, iterative data 204, database(s) 320, etc.). For example, the computing system may store the media content item and associated input from the user as training data 202 to initially train a machine learning model 208. In another example, the computing system may store the media content item and input from the user as iterative data 204 to update a machine learning model 208 with the current data. The computing system may receive a plurality of media content items and associated input from a plurality of computing devices. The computing system may store the plurality of media content items and associated input from a plurality of computing devices as training data 202 or iterative data 204.

The machine learning model may be periodically updated (e.g., every month, every six months, etc.). For example, the computing system may use the iterative data 204 comprising the plurality of media content items and inputs from the plurality of computing devices to build an updated machine learning model 208. The updated machine learning model 208 is provided to the plurality of computing devices so that each of the plurality of computing devices is using the updated machine learning model 208. Each of the computing devices may receive the updated machine learning model 208 and update an application or this functionality accordingly.

In operation 712, the computing device updates a food detector functionality to comprise an updated machine learning model for food detection based on the sent media content item and user input in response to the interactive features. The food detector functionality may be standalone functionality or may be part of a messaging application on the computing device. The updated food detector functionality may be further based on the plurality of captured media content items and input from a plurality of users in response to interactive features sent by a plurality of computing devices, as described above.

Once the machine learning model has been trained, it may be used even when the computing device is not located near a food-related venue or event. For example, the computing device may detect that a media content item is being captured by a user and analyze the media content item to determine that it comprises food. For example, the computing device may input the media content item into the machine learning model and determine, based on the prediction that is output, whether or not the media content item comprises food, as described above. If the computing device determines that the media content item comprises food, one or more interactive features may be triggered and presented to the user, as described above. In this way, the computing device causes a user to input descriptive data about the media content item to be used to update the machine learning model. As described above, the media content item and input from the user in response to the interactive features are sent to the computing system to incorporate into a machine learning model. The updated machine learning model is then provided to the computing device.

Example embodiments describe using a machine learning model to detect food in images, however, food may also be detected in other media content. For example, food may be detected in video (e.g., a video captured by a user via a computing device). To detect food in a video, the computing device may sample key frames from a video. The computing device may input the key frames, frame by frame, into the machine learning model. The machine learning model will output a prediction (e.g., score) for each key frame. The computing system will average the scores for each key frame. The computing system will use the averaged score to determine whether there is food detected in the video, as explained above.

The following examples describe various embodiments of methods, machine-readable media, and systems (e.g., machines, devices, or other apparatus) discussed herein.

Example 1. A method comprising:

detecting, by a computing device, capture of a media content item by the computing device using a messaging application;

analyzing, by the computing device, location data associated with a location of the computing device to determine that the media content item is captured near a food-related venue or event;

presenting, by the computing device, interactive features on a display of the computing device to capture an input to the computing device related to food associated with the food-related venue or event;

receiving, by the computing device, the input in response to the presented interactive features;

sending, by the computing device, the media content item and the input in response to the interactive features, to a computing system to incorporate the media content item and input into a machine learning model for food detection; and updating, by the computing device, the messaging application to update a food detector functionality of the messaging application to comprise an updated machine learning model for food detection based on the media content item and the input in response to the interactive features.

Example 2. A method according to example 1, wherein after analyzing the location data associated with the location of the computing device to determine that the media content item is captured near the food-related venue or event, the method further comprises:

determining that the media content item comprises food using the machine learning model for food detection.

Example 3. A method according to any of the previous examples, wherein determining that the media content item comprises food using the machine learning model for food detection comprises:

inputting the media content item into the machine learning model for food detection;

generating a prediction value for the media content item;

determining whether the prediction value exceeds a predetermined threshold value; and determining that the media content item comprises food based on the prediction value exceeding the predetermined threshold value.

Example 4. A method according to any of the previous examples, wherein analyzing the location data associated with the location of the computing device to determine that the media content item is captured near the food-related venue or event comprises comparing the location data to map data to determine that the location of the computing device is near the food-related venue or event.

Example 5. A method according to any of the previous examples wherein the interactive features comprise a media overlay, a lens, or a request for a review of the food-related venue or event.

Example 6. A method according to any of the previous examples, wherein the interactive features comprise a request for an image of food from the food-related venue or event, and the media content item sent to the computing system is the requested image.

Example 7. A method according to any of the previous examples, wherein the computing system receives the media content item and associated input from the computing device and stores the received media content item and associated input in a database with a plurality of captured media content items and associated input from a plurality of computing devices.

Example 8. A method according to any of the previous examples, wherein the updated machine learning model for food detection based on the media content item and the input in response to the interactive features is further based on a plurality of captured media content items and input from a plurality of users in response to interactive features sent by a plurality of computing devices.

Example 9. A method according to any of the previous examples, wherein after analyzing the location data associated with the location of the computing device to determine that the media content item is captured near the food-related venue or event, the method further comprises:

determining that the media content item does not comprise food, using the trained machine learning model for food detection; and wherein the interactive features presented comprise features to incentivize capture of an image of food associated with the food-related venue or event.

Example 10. A computing device comprising:

one or more hardware processors; and a computer-readable medium coupled with the one or more hardware processors, the computer-readable medium comprising instructions stored thereon that are executable by the one or more hardware processors to cause the computing device to perform operations comprising:

detecting capture of a media content item by the computing device using a messaging application;

analyzing location data associated with a location of the computing device to determine that the media content item is captured near a food-related venue or event;

presenting interactive features on a display of the computing device to capture input related to food associated with the food-related venue or event;

receiving the input in response to the presented interactive features;

sending the media content item and the input in response to the interactive features, to a computing system to incorporate the media content item and input into a machine learning model for food detection; and updating the messaging application to update a food detector functionality of the messaging application to comprise an updated machine learning model for food detection based on the media content item and input in response to the interactive features.

Example 11. A computing device according to any of the previous examples, wherein after analyzing the location data associated with the location of the computing device to determine that the media content item is captured near the food-related venue or event, the operations further comprise:

determining that the media content item comprises food using a machine learning model for food detection.

Example 12. A computing device according to any of the previous examples, wherein determining that the media content item comprises food using the trained machine learning model for food detection comprises:

inputting the media content item into the machine learning model for food detection;

generating a prediction value for the media content item;

determining whether the prediction value exceeds a predetermined threshold value; and determining that the media content item comprises food based on the prediction value exceeding the predetermined threshold value.

Example 13. A computing device according to any of the previous examples, wherein analyzing the location data associated with the location of the computing device to determine that the media content item is captured near the food-related venue or event comprises comparing the location data to map data to determine that the location of the computing device is near the food-related venue or event.

Example 14. A computing device according to any of the previous examples, wherein the interactive features comprise a media overlay, a lens, or a request for a review of the food-related venue or event.

Example 15. A computing device according to any of the previous examples, wherein the interactive features comprise a request for an image of food from the food-related venue or event, and the media content item sent to the computing system is the requested image.

Example 16. A computing device according to any of the previous examples, wherein the computing system receives the media content item and associated input from the computing device and stores the received media content item and associated input in a database with a plurality of captured media content items and associated input from a plurality of computing devices.

Example 17. A computing device according to any of the previous examples, wherein the updated machine learning model for food detection based on the media content item and the input in response to the interactive features is further based on a plurality of captured media content items and input from a plurality of users in response to interactive features sent by a plurality of computing devices.

Example 18. A computing device according to any of the previous examples, wherein after analyzing the location data associated with the location of the computing device to determine that the media content item is being captured near the food-related venue or event, the operations further comprise:

determining that the media content item does not comprise food, using the trained machine learning model for food detection; and wherein the interactive features presented comprise features to incentivize capture of an image of food associated with the food-related venue or event.

Example 19. A non-transitory computer-readable medium comprising instructions stored thereon that are executable by at least one processor to cause a computing device to perform operations comprising:

detecting capture of a media content item by the computing device using a messaging application;

analyzing location data associated with a location of the computing device to determine that the media content item is captured near a food-related venue or event;

presenting interactive features on a display of the computing device to capture input related to food associated with the food-related venue or event;

receiving the input in response to the presented interactive features;

sending the media content item and the input in response to the interactive features, to a computing system to incorporate the media content item and input into a machine learning model for food detection; and updating the messaging application to update a food detector functionality of the messaging application to comprise an updated machine learning model for food detection based on the media content item and input in response to the interactive features.

Example 20. A non-transitory computer-readable medium according to any of the previous examples, wherein the updated machine learning model for food detection based on the media content item and input in response to the interactive features is further based on a plurality of captured media content items and input from a plurality of users in response to interactive features sent by a plurality of computing devices.

Figure 10:
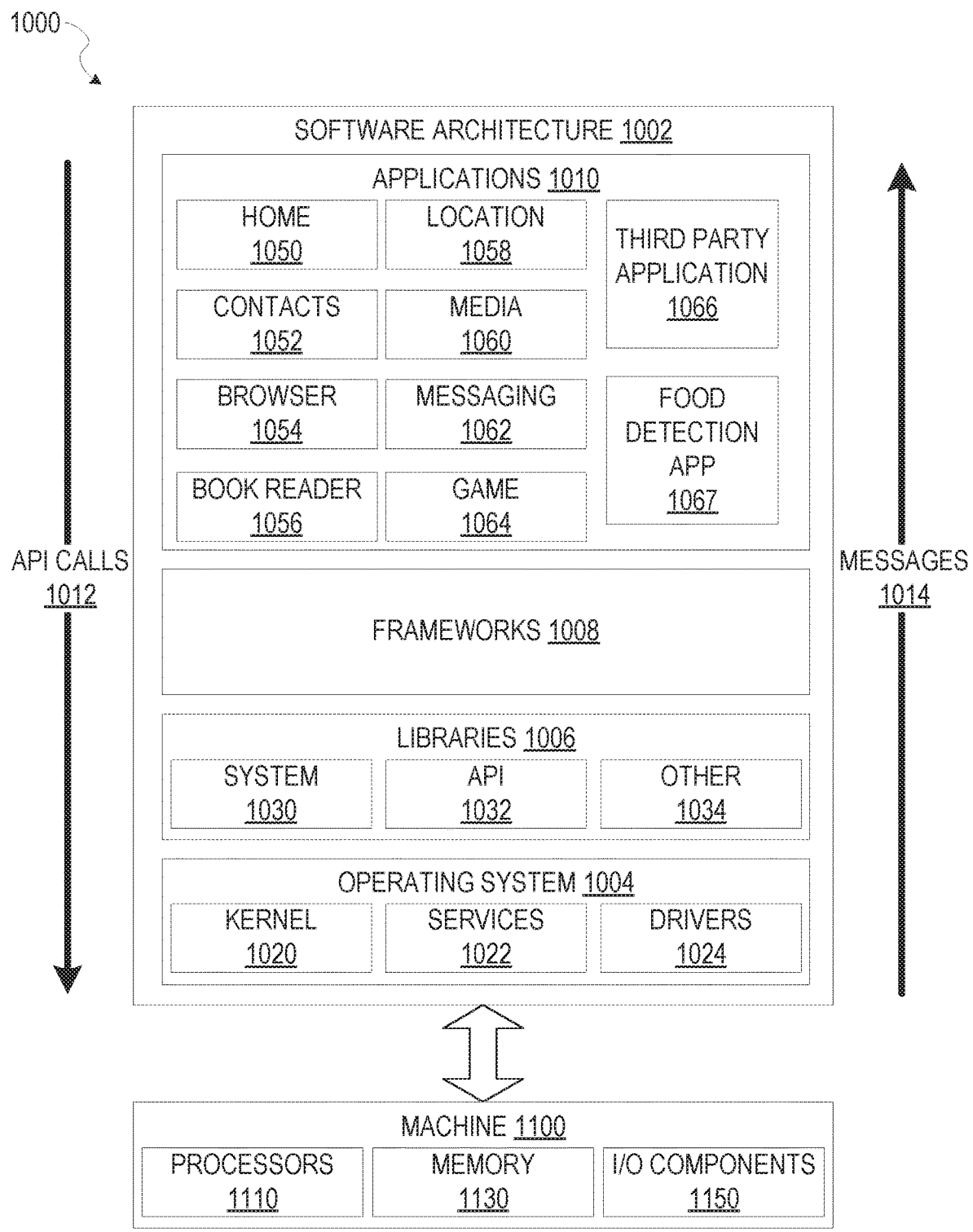
FIG. 10 is a block diagram illustrating an example of a software architecture that may be installed on a machine, according to some example embodiments.

FIG. 10 is a block diagram 1000 illustrating a software architecture 1002, which can be installed on any one or more of the devices described above. For example, in various embodiments, client devices 110 and server systems 102, 120, 122, 124, 130, 308, 310, 312, 314, 316, 322 may be implemented using some or all of the elements of the software architecture 1002. FIG. 10 is merely a non-limiting example of a software architecture, and it will be appreciated that many other architectures can be implemented to facilitate the functionality described herein. In various embodiments, the software architecture 1002 is implemented by hardware such as machine 1100 of FIG. 11 that includes processors 1110, memory 1130, and I/O components 1150. In this example, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC). Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C. Java. or C++) or procedural programming languages (e.g., C or assembly language). In a specific example, the third party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 1066 can invoke the API calls 1012 provided by the operating system 1004 to facilitate functionality described herein.

Some embodiments may particularly include a food detection application 1067. In certain embodiments, this may be a standalone application that operates to manage communications with a server system such as third party servers 130 or server system 102 or 308. In other embodiments, this functionality may be integrated with another application (e.g., messaging application 1062). The food detection application 1067 may request and display various data related to messaging, media content, media collections, media overlays, and so forth, and may provide the capability for a user 106 to input data related to the system via a touch interface, keyboard, or using a camera device of machine 1100, communication with a server system via I/O components 1150, and receipt and storage of object data in memory 1130. Presentation of information and user inputs associated with the information may be managed by the food detection application 1067 using different frameworks 1008, library 1006 elements, or operating system 1004 elements operating on a machine 1100.

Figure 11:
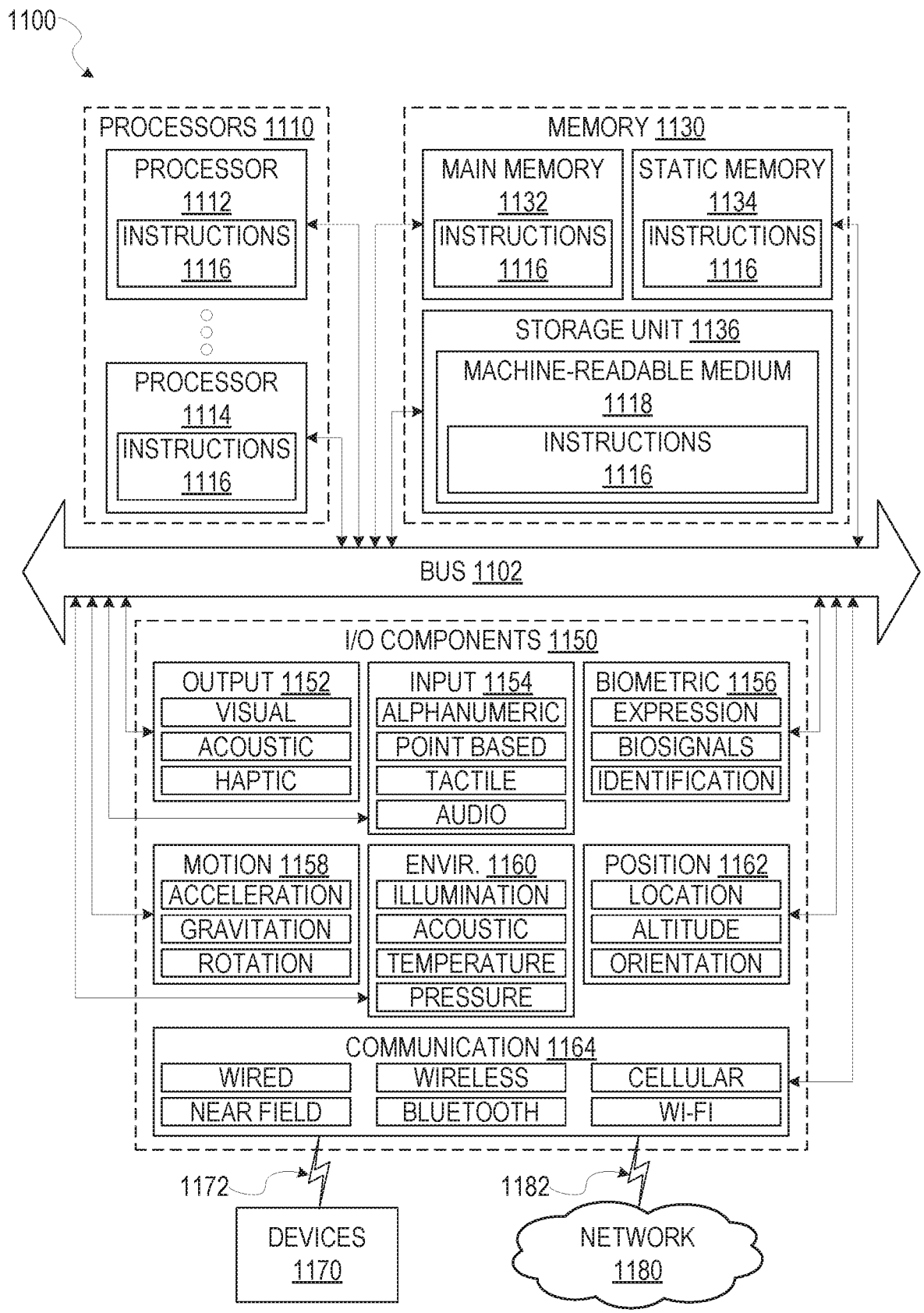
FIG. 11 illustrates a diagrammatic representation of a machine, in the form of a computer system, within which a set of instructions may be executed for causing the machine to perform any one or more of the methodologies discussed herein, according to an example embodiment.

FIG. 11 is a block diagram illustrating components of a machine 1100, according to some embodiments, able to read instructions from a machine-readable medium (e.g., a machine-readable storage medium) and perform any one or more of the methodologies discussed herein. Specifically. FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein can be executed. In alternative embodiments, the machine 1100 operates as a standalone device or can be coupled (e.g., networked) to other machines. In a networked deployment, the machine 1100 may operate in the capacity of a server machine 102, 120, 122, 124, 130, 308, 310, 312, 314, 316, 322, and the like, or a client device 110 in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute instructions 1116 contemporaneously. Although FIG. 11 shows multiple processors 1110, the machine 1100 may include a single processor 1110 with a single core, a single processor 1110 with multiple cores (e.g., a multi-core processor 1110), multiple processors 1112, 1114 with a single core, multiple processors 1112, 1114 with multiple cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1118 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1118.

As used herein, the term "memory" refers to a machine-readable medium 1118 able to store data temporarily or permanently and may be taken to include, but not be limited to, random-access memory (RAM), read-only memory (ROM), buffer memory, flash memory, and cache memory. While the machine-readable medium 1118 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions 1116, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, near field communication (NFC) components. BLUETOOTH® components (e.g., BLUETOOTH® Low Energy), WI-FI® components, and other communication components to provide communication via other modalities. The devices 1170 may be another machine 1100 or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include radio frequency identification (RFID) tag reader components. NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code. Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1xRTT). Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA). Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1118 is non-transitory (in other words, not having any transitory signals) in that it does not embody a propagating signal. However, labeling the machine-readable medium 1118 "non-transitory" should not be construed to mean that the medium is incapable of movement; the medium 1118 should be considered as being transportable from one physical location to another. Additionally, since the machine-readable medium 1138 is tangible, the machine-readable medium 1118 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
analyzing, by a computing device, location data associated with a location of the computing device to determine that an image or video captured using a messaging application on the computing device is captured near a food-related venue or event;
receiving, by the computing device, input related to food associated with the food-related venue or event;
sending, by the computing device, the image or video and the input related to food associated with the food-related venue or event to a computing system to train a machine learning model for food detection;
updating, by the computing device, the messaging application to comprise the trained machine learning model for food detection;
detecting capture of a second image or video using the messaging application; and
determining that the second image or video comprises food using the trained machine learning model for food detection.

2. The method of claim 1, wherein determining that the second image or video comprises food using the trained machine learning model for food detection comprises:
inputting the second image or video into the machine learning model for food detection;
generating a prediction value for the second image or video;
determining whether the prediction value exceeds a predetermined threshold value; and
determining that the second image or video comprises food based on the prediction value exceeding the predetermined threshold value.

3. The method of claim 1, wherein analyzing the location data associated with the location of the computing device to determine that the image or video is captured near the food-related venue or event comprises comparing the location data to map data to determine that the location of the computing device is near the food-related venue or event.

4. The method of claim 1, wherein the input is received in response to presented interactive features and the interactive features comprise a media overlay, a lens, or a request for a review of the food-related venue or event.

5. The method of claim 1, wherein the input is received in response to presented interactive features and the interactive features comprise a request for an image of food from the food-related venue or event, and the image or video sent to the computing system is the requested image.

6. The method of claim 1, wherein the computing system receives the image or video and associated input from the computing device and stores the received image or video and associated input in a database with a plurality of captured images and videos and associated input from a plurality of computing devices.

7. The method of claim 1, wherein the trained machine learning model for food detection is further trained on a plurality of captured images and videos and input sent by a plurality of computing devices.

8. The method of claim 1, further comprising:
detecting capture of a third image or video using the messaging application;
determining that the third image or video is captured near a food-related venue or event;
determining that the third image or video does not comprise food, using the trained machine learning model for food detection; and
presenting interactive features to incentivize capture of an image of food associated with the food-related venue or event.

9. The method of claim 8, further comprising:
in response to the presented interactive features, receiving a fourth image; and
sending the fourth image to the computing system to update the trained machine learning model for food detection.

10. A computing device comprising:
one or more hardware processors; and
a computer-readable medium coupled with the one or more hardware processors, the computer-readable medium comprising instructions stored thereon that are executable by the one or more hardware processors to cause the computing device to perform operations comprising:
analyzing location data associated with a location of the computing device to determine that an image or video captured using a messaging application on the computing device is captured near a food-related venue or event;
receiving input related to food associated with the food-related venue or event;
sending the image or video and the input related to food associated with the food-related venue or event to a computing system to train a machine learning model for food detection;
updating the messaging application to comprise the trained machine learning model for food detection;
detecting capture of a second image or video using the messaging application; and
determining that the second image or video comprises food using the trained machine learning model for food detection.

11. The computing device of claim 10, wherein determining that the second image or video comprises food using the trained machine learning model for food detection comprises:
inputting the second image or video into the machine learning model for food detection;
generating a prediction value for the second image or video;
determining whether the prediction value exceeds a predetermined threshold value; and
determining that the second image or video comprises food based on the prediction value exceeding the predetermined threshold value.

12. The computing device of claim 10, wherein analyzing the location data associated with the location of the computing device to determine that the image or video is captured near the food-related venue or event comprises comparing the location data to map data to determine that the location of the computing device is near the food-related venue or event.

13. The computing device of claim 10, wherein the input is received in response to presented interactive features and the interactive features comprise a media overlay, a lens, or a request for a review of the food-related venue or event.

14. The computing device of claim 10, wherein the input is received in response to presented interactive features and the interactive features comprise a request for an image of food from the food-related venue or event, and the image or video sent to the computing system is the requested image.

15. The computing device of claim 10, wherein the trained machine learning model for food detection is further trained on a plurality of captured images and videos and input sent by a plurality of computing devices.

16. The computing device of claim 10, further comprising:
detecting capture of a third image or video using the messaging application;
determining that the third image or video is captured near a food-related venue or event;
determining that the third image or video does not comprise food, using the trained machine learning model for food detection; and
presenting interactive features to incentivize capture of an image of food associated with the food-related venue or event.

17. The computing device of claim 16, the operations further comprising:
in response to the presented interactive features, receiving a fourth image; and
sending the fourth image to the computing system to update the trained machine learning model for food detection.

18. A non-transitory computer-readable medium comprising instructions stored thereon that are executable by at least one processor to cause a computing device to perform operations comprising:
analyzing location data associated with a location of the computing device to determine that an image or video captured using a messaging application on the computing device is captured near a food-related venue or event;
receiving input related to food associated with the food-related venue or event;
sending the image or video and the input related to food associated with the food-related venue or event to a computing system to train a machine learning model for food detection;
updating the messaging application to comprise the trained machine learning model for food detection;
detecting capture of a second image or video using the messaging application; and
determining that the second image or video comprises food using the trained machine learning model for food detection.

* * * * *